United States Patent [19]

Harada et al.

[11] Patent Number: 4,769,992
[45] Date of Patent: Sep. 13, 1988

[54] RECIPROCATION APPARATUS WITH SEALING MECHANISM

[75] Inventors: Terumaru Harada, Moriguchi; Kenichi Inoda; Tatsuo Fujita, both of Hirakata; Kinichi Adachi, Takarazuka, all of Japan

[73] Assignee: Matsushita Electric Industrial Co., Ltd., Kadoma, Japan

[21] Appl. No.: 947,780

[22] Filed: Dec. 30, 1986

[51] Int. Cl.⁴ .......................... F01B 29/10; F02G 1/04
[52] U.S. Cl. .......................................... 60/520; 92/38; 92/83; 277/15; 277/34; 277/75; 277/135
[58] Field of Search ..................... 60/517, 520; 277/15, 277/34, 75, 135; 92/38, 83

[56] References Cited

U.S. PATENT DOCUMENTS

| | | | |
|---|---|---|---|
| 2,735,369 | 2/1956 | Turvey | 92/38 |
| 2,747,614 | 5/1956 | Gray | 92/38 |
| 3,748,970 | 7/1973 | Van der | 92/83 |
| 4,036,112 | 7/1977 | Hubschmann | 92/83 |
| 4,156,530 | 5/1979 | Rivkin | 277/135 |
| 4,532,766 | 8/1985 | White | 60/520 |

FOREIGN PATENT DOCUMENTS 301975  10/1932  Italy .......................... 277/15

Primary Examiner—Douglas Hart
Attorney, Agent, or Firm—Cushman, Darby & Cushman

[57] ABSTRACT

In a sealing mechanism for a reciprocation apparatus for use in a reciprocating engine having a reciprocation member (108), such as Stirling engine, oil or a fluid is enclosed in a fluid room constituted by a pair of flexible partitioning members (112,113) such as diaphragms or multiple bellows and side walls (111a,111b) of a cylinder (111) or the like, and the fluid room is divided in two parts (114,115) by a pressure-resistive sealing member (116) fixed to inside wall of a rigid partition wall (111f) to roughly seal the fluid allowing sliding motions of the reciprocating member therein.

10 Claims, 4 Drawing Sheets

RECIPROCATION APPARATUS WITH SEALING MECHANISM

FIELD OF THE INVENTION AND RELATED ART STATEMENT

1. Field of the Invention

The present invention relates to a reciprocation apparatus with sealing mechanism for use in a machine having a reciprocating part to prevent leaking of gas or fluid from a space on one side of the reciprocating part to another space on the other side thereof, and especially, relates to a reciprocation apparatus with sealing mechanism for use in a Stirling engine for preventing the leaking of the high pressure actuating gas enclosed in the internal space to outside.

2. Description of the Related Art

The Stirling engine enclosing helium or the like gas as an actuating gas is a typical apparatus having reciprocating part and has a need of tight sealing. The Stirling engine is constituted to have steps of heating and cooling the actuating gas by a heater or a cooler to make pressure changes due to the expansion and compression of the actuating gas, and outputting power through a power piston driven by the pressure change. If the abovementioned actuating gas leaks to outside of the engine, the output power level of the engine may decrease. Furthermore, if the lubricating oil in the crank chamber is carried to a part of the heater, the lubricating oil may be deteriorated by the heat to make carbon, which adheres and accumulate in the engine. As a result, there is a problem of choking of passage of the actuating gas by the carbon.

In order to dissolve the above-mentioned problem, a sealing ring, which is made of a material containing carbon or fluoroethylene or of other additional materials and is for sealing sliding parts around rods, is conventionally used as a reciprocation apparatus with sealing mechanism. Besides, as another counterplan, a rolling type diaphragm is disclosed for the reciprocation apparatus with sealing mechanism, (which is, for example, shown in a book by S. ISSIKI, "Development of the Stirling Engine" published from Kogyo Chosakai Publishing Co., Ltd., Tokyo Japan 1982 p57, and p194–p196.). As an example, a rolling seal which is shown in FIG. 4 is known as a reciprocation apparatus with sealing mechanism. In FIG. 4, a rolling diaphragm 403 which is made of rubber and so called as roll-sock, is disposed between a rod 401 which moves reciprocally and a housing 402, and the actuating gas in a motion area 404 is prevented to flow out to a crank chamber 405. As the pressure of the actuating gas in the motion area 404 is high, the rolling diaphragm 403 is supported by oil 410 in a oil room 407 which is governed by a pressure governor 406. The oil flowing to the crank chamber 405 from the pressure governor 406 is sent back to the oil room 407 responding to the reciprocating motion of the rod 401 by action of an oil pumping ring 408.

In the above-mentioned conventional reciprocation apparatus with sealing mechanism, however, the sealing ring is insufficient to prevent the leakage of the enclosed actuating gas. Further, in the conventional reciprocation apparatus with sealing mechanism, the power loss due to the resistance at the sealing part is large, and the wear of the sealing ring becomes a problem. On the other hand, in another case of the conventional reciprocation apparatus with sealing mechanism in which a rolling diaphragm 403 is used, quantity of the oil held in the oil room 407 is unstable, an oil quantity control apparatus becomes complicate, and the oil may be polluted and/or deteriorated when the oil is returned from the crank chamber 405 until to fill the wanted quantity of the oil. And also, when the temperature of the engine is raised during the operation of the engine, the gas contained in the oil is bubbled and a trouble of cavitation occurs, accordingly the life of the reciprocation apparatus with sealing mechanism becomes short.

OBJECT AND SUMMARY OF THE INVENTION

The object of the present invention is to provide an improved reciprocation apparatus with sealing mechanism having a long service time without any maintenance.

The reciprocation apparatus with sealing mechanism in accordance with the present invention comprises,
a motion chamber,
at least one reciprocation member movably provided in the motion chamber,
a sealing member disposed between the reciprocation member and inside wall of the motion chamber in which the reciprocation member moves,
a first fluid room and a second fluid room defined by both side of the sealing member and the inside wall of the motion chamber and the reciprocation member, and
a first flexible partitioning member and a second flexible partitioning member respectively partitioning the first fluid room and the second fluid room, respectively.

DESCRIPTION OF THE PREFERRED EMBODIMENTS

Figure 1:
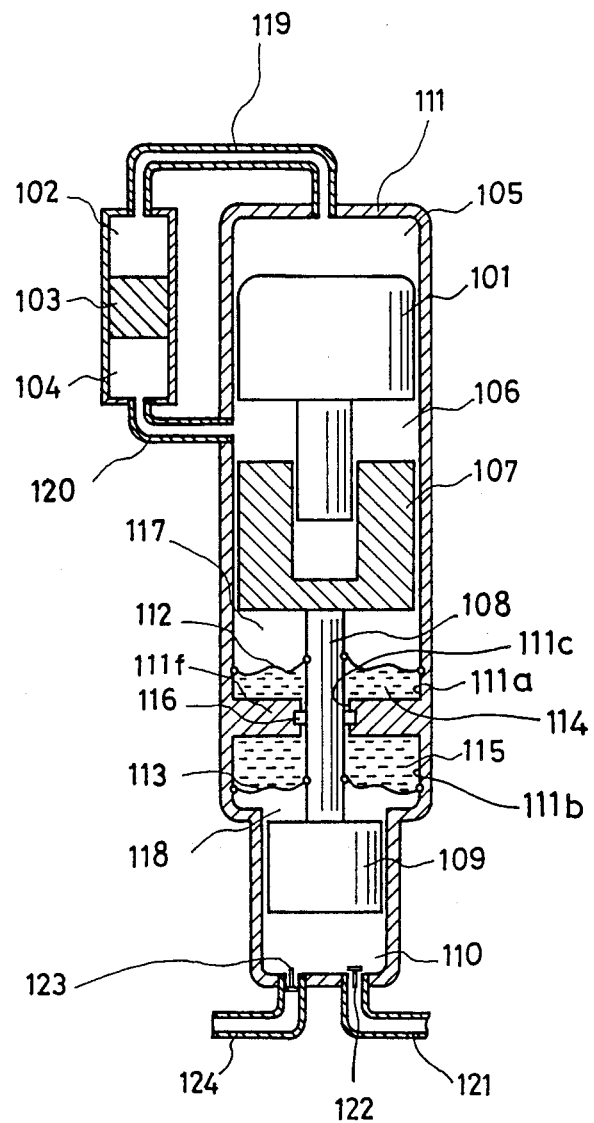
FIG. 1 is a cross-section view of an embodiment of a reciprocation apparatus with sealing mechanism in accordance with the present invention.

A preferred embodiment of a reciprocation apparatus with sealing mechanism in accordance with the present invention is described as follows with reference to the attached drawings. FIG. 1 shows a preferred embodiment of a reciprocation apparatus with sealing mechanism of the present invention used in a Stirling engine, (for example described in Marusak et al. The Matching Of A Free Piston Stirling Engine Coupled With A Free Piston Linear Compressor For A Heat Pump Application, International Energy Conversion Engineering, vol. 3, p. 1820–1825, 1978).

In FIG. 1, an actuating gas such as helium or the like which is enclosed in the Stirling engine is reciprocatively moved bilaterally between a high-temperature area 105 and a low-temperature area 106 with passing through a pipe 119, a heater 102, a regenerator 103 which use, for example, a sintered metal, a cooler 104 and a pipe 120 by a reciprocating motion of a displacer 101. On this occasion, the actuating gas repeats expansion and compression due to the heating of the heater 102 and the cooling of the cooler 104. The Stirling engine issues the output power by reciprocating motion of a power piston 107 to an external part which is moved by the pressure variation due to the repetition of the expansion and compression of the actuating gas. This embodiment shows a case that the Stirling engine is applied to a heat pump, and then the power piston 107 is connected to a compression piston 109 with a disposing rod 108 in the middle. A refrigerant such as FREON gas (FREON is a registered trademark of the Dupont Co.) is inhaled to a cylinder chamber 110 through a valve 122 and a pipe 121, and is exhausted from the cylinder chamber 110 through a valve 123 and a pipe 124. A reciprocation member 108 with sealing mechanism is disposed between the power piston 107 and the compression piston 109, and the reciprocation member 108 with sealing mechanism comprises two diaphragms 112 and 113 which are disposed to connect the rod 108 and inner walls 111a, 111b of a housing 111 and a certain amount of fluid enclosed in fluid rooms 114 and 115 which are constituted by inner walls 111a and 111b of the housing 111 and the diaphragms 112 and 113. Further, a pressure-resistive rod seal 116 is provided on an inner wall 111c of a partition wall 111f so that the rod 118 is slidable in its throughhole.

As a result, the actuating gas in an upper chamber 117 is separated by the diaphragm 112 from the fluid room 114 which is filled with the fluid for supporting the diaphragm 112. Similarly, the refrigerant in the lower chamber 118 is separated by the diaphragm 113 from the fluid room 15 which is filled with the fluid for supporting the diaphragm 113.

When the pressure of the actuating gas in the upper chamber 117 is not equal to that of the cooling medium in the lower chamber 118, a pressure difference between the pressure of the fluid in the fluid room 114 and the pressure of the fluid in the fluid room 115 is generated. Then, the pressure-resistive rod seal 116 is disposed for preventing the outflow and inflow of the fluids in the fluid rooms 114 and 115 due to the pressure difference. The pressures of the fluid in the fluid room 114 is separated from the pressure of the fluid in the fluid room 115 by the pressure-resistive rod sealing 116, and therefore the pressure of the actuating gas in the chamber 117 can be nearly equal to the pressure of the fluid in the fluid room 114. Accordingly, the diaphragm 112 does not receive an unreasonable pressure. The pressure of the cooling medium in the chamber 118 can also be the same as that of the fluid in the fluid room 115, the diaphragm 113 does not receive unreasonable pressure too. As a result, irrespective of an increase of the pressure difference between the actuating gas in the chamber 117 and the refrigerant in the chamber 118, the actuating gas can be safely sealed without any leakage.

Figure 2:
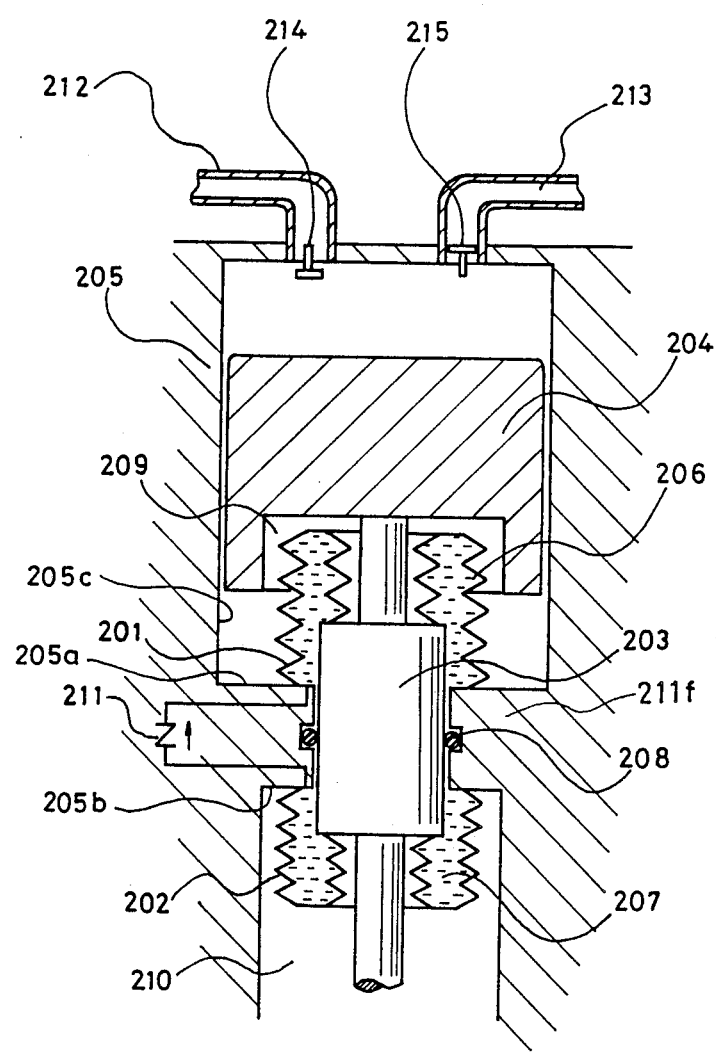
FIG. 2 is a cross-section view of a main part of a pump for carrying a particular fluid with using a reciprocation apparatus with sealing mechanism in accordance with the present invention.

Another preferred embodiment of a reciprocation apparatus with sealing mechanism in accordance with the present invention is described as follows with reference to FIG. 2. FIG. 2 shows a cross-sectional view of an embodiment of the reciprocation apparatus with sealing mechanism of the present invention used in a pump for carrying a special fluid in the field of chemical field. Generally, the special fluid needs to be sealed perfectly without leakage to the external part. In this embodiment, double bellows 201 and 202 are used in place of the diaphragms of the embodiment of FIG. 1, and the special fluid is carried by the reciprocating motion of a piston 204 which is driven from the external part responding to a rod 203. Namely, the special fluid is inhaled through a pipe 212 and a valve 214 and is exhausted through a valve 215 and a pipe 213. A side of a bellows which constitutes the outside of the double bellows (hereinafter it is abbreviated as the outside bellows) is fixed on a divisional wall 205a of a housing 205, the other side of the outside bellows is connected to a side of a bellows which is the inside of the double bellows (hereinafter, it is abbreviated as the inside bellows), and the other side of the inside bellows is fixed on the rod 203. Furthermore, a pressure-resistive sealing member 208 such as motional type O-ring is provided between fluid rooms 206 and 207 which enclose pressure transmission fluid contacting the rod 203 and a partition wall 211f of the housing 205. By such constitution, the pressure difference can be received by the sealing member 208. And also, since one side of the double bellows 201 and 202 can freely move, they can be applied to the change of volumes of the fluid rooms 206 and 207 during the reciprocating motion of the rod 203. Namely, the double bellows 201 and 202 are made expand or contract, so as to make pressures of an actuating fluid in the chamber 209 and the fluid in the fluid room 206 and pressures in the chamber 210 and of the fluid in the fluid room 207, respectively, nearly equal each other during the reciprocating motion of the rod 203 and the piston 204. In this embodiment, as a fluid carrying means, a check valve 211 is disposed to send back the object fluid that leaks into the fluid room 207 from the fluid room 209 due to that the pressure in the chamber 209 is higher than that in the chamber 210. When the double bellows 201 is pressed to its contraction limit due to a lack of the fluid in the fluid room 206, the pressure of the fluid room 206 wherein the fluid becomes temporarily lacking is lower than that of the other fluid room 207, and therefore the fluid flows from the fluid room 207 into the fluid room 206 wherein the fluid is lacking passing through the check valve 211. As mentioned above, by providing the fluid carrying means such as the check valve or pump, use of such sealing member 208 as having small leakage of the fluid becomes permissible. Accordingly, a simple sealing member 208 can be used and energy loss owing to the sliding resistance can be reduced.

Hereupon, the inside bellows is shown as shorter than the outside bellows in FIG. 2, but it is allowable to make the length of the inside bellows equal to or longer than that of the outside bellows. Furthermore, a triple bellows, a quadruple bellows or a multiple bellows can be used in place of the double bellows of the embodiment of FIG. 2.

Figure 3:
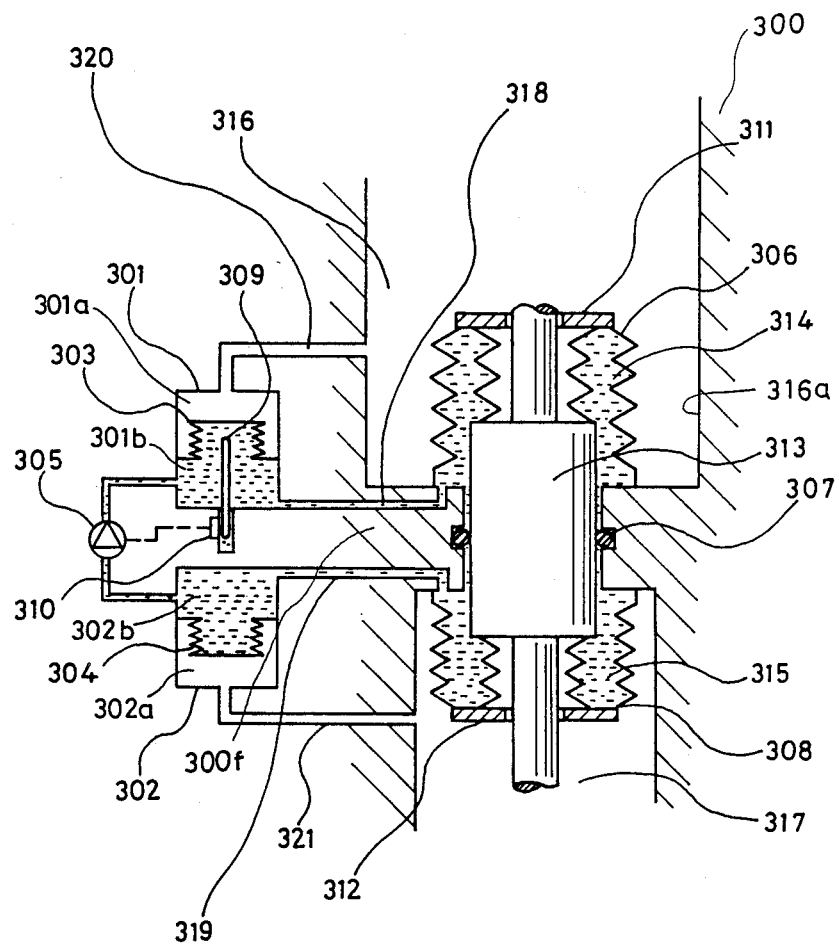
FIG. 3 is a cross-section view of another embodiment of a reciprocation apparatus with sealing mechanism in accordance with the present invention.
Figure 4:
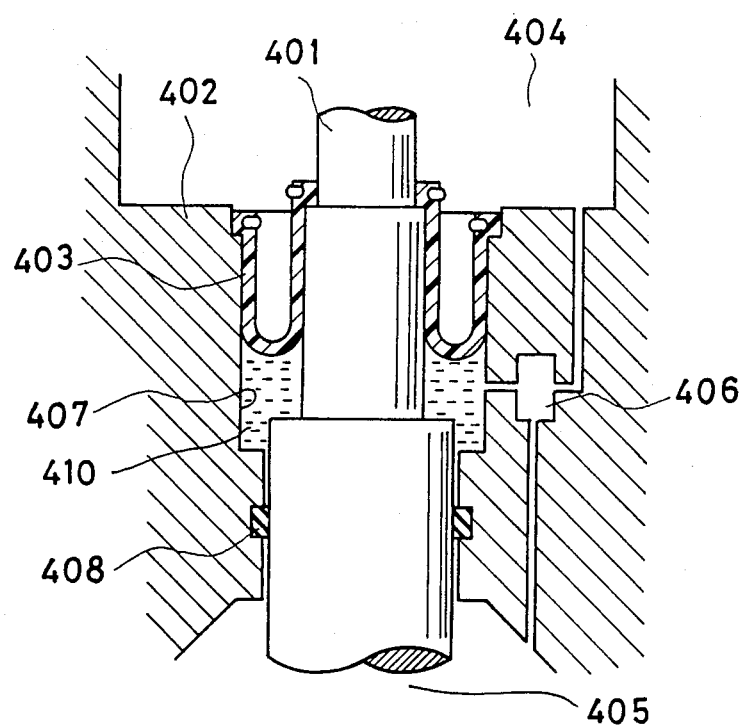
FIG. 4 in a cross-section view of the conventional reciprocation apparatus with sealing mechanism.

FIG. 3 shows still other embodiment of the reciprocation apparatus with sealing mechanism of the present invention, which further comprises sub-cavities 301 and 302, sub-bellows 303 and 304, for separating the sub-cavities 301 and 302, respectively, into two parts, and a pump 305 provided between the sub-cavities 301 and 302.

Fluid rooms of the sub-cavities 301 and 302 are connected to fluid rooms 314 and 315 of double bellows 306 and 308 by pipes 318 and 319, respectively. When the fluid in the fluid room 314 of the double bellows 306 leaks excessively to the fluid room 315 of the double bellows from a pressure-resistive sealing 307 (hereupon, the pressure of a gas in a chamber 316 which is upper part of the rod 313 is higher than that of a chamber 317 which is lower part of the rod 313), the sub-bellows 303 in the sub-chamber 301 comes down below a predetermined position. A shaft 309 which is connected to the sub-bellows 303 also comes down, and then a switch 310 is automatically turned on responding to the motion of the shaft 309, and the pump 305 is started to drive. As a result, the fluid is carried from the lower sub-bellows 304 to the upper sub-bellows 303 until the quantity of the fluid in the upper sub-bellows 303 reaches a predetermined value. The gas chamber 301a and 302a of the sub-chamber 301 and 302 are respectively connected to the main gas cavities 316 and 317 by the pipes 320 and 321. (The cavities 301a, 302a, 316 and 317 are preferably filled with fluid.) By such constitution, necessary quantity of the fluid can be kept in respective fluid rooms (especially, in the double bellows 306 and 308). And the chamber having pressure difference can be sealed stably. In this embodiment, low sliding resistance members 311 and 312 made of such as TEFLON (TEFLON is registered trademark of the DUPONT CO.) are provided on the free edge of the double bellows 306 and 308 for preventing rolling of the double bellows. Accordingly, the double bellows may not be damaged by sliding on the side wall 316a of the chamber 316, or the like.

Furthermore, in case that the rigidity of the sub-bellows 303 or 304 is set lower than that of the double bellows 306 or 308, even though the fluid leaks out the sub-bellows 303 or 304 can follow the leak-out quantity by its deforming prior to deforming of the double bellows. Accordingly, the double bellows 306 or 308 need not deform even at the leakage of the fluid, and the apparatus such as Stirling engine or a pump can be kept in the best state for operation. By using a pipe having fairly large fluid resistance for the pipe 318 or 319, an undesirable interference between the double bellows 306 or 308 and the sub-bellows 303 or 304 can be avoided. This is applicable not only to the multiple bellows, but also to the cases of using ordinary bellows and diaphragm.

As mentioned above, in the reciprocation apparatus with sealing mechanism of the present invention, the fluid such as oil can be confined tightly in a room formed by at least two flexible positioning members such as bellows or diaphragm or the like and the side wall of the housing or the like, which room has a pressure difference to adjacent chamber. As a result, the fluid may not be polluted and deteriorated, for instance due to the leakage to and from a crank chamber, and the reciprocation apparatus with sealing mechanism such as a Stirling engine does not need any maintenance. And since a tight sealing mechanism can be constituted, the gas contained in the fluid can be deaerated prior to sealing of the fluid in the room, so that such a trouble as cavitation due to bubbling of the gas at a large change of temperature or pressure in operation can be prevented, and the reciprocation apparatus with sealing mechanism can be operated long without maintenance. Furthermore, since the fluid need not serve as lubricant, the most suitable fluid can be selected as the pressure transfer fluid, which has low fluid loss and non-gassing. Further, as the oil room is divided into two parts by the pressure-resistive sealing, the two rooms of different pressure can be safely sealed, and the sealing member is always retained in the confined fluid. Accordingly, the wear of the sealing member is negligible and the sealing member can enjoy a long life.

What is claimed is:

1. A reciprocation apparatus with sealing mechanism comprising:
   a chamber,
   at least one reciprocation member movably provided in said chamber,
   a sealing member disposed between said reciprocation member and inside wall of said chamber in which said reciprocation member moves,
   a first fluid room and a second fluid room defined by both sides of said sealing member, said inside wall of said chamber and said reciprocation member,
   a first flexible partitioning member and a second flexible partitioning member respectively partitioning said first fluid room and said second fluid room, respectively, and
   a fluid carrying means for carrying fluid between said first fluid room and said second fluid room and including:
   (a) a first and a second sub-chamber respectively connected to said first and second fluid rooms,
   (b) a first flexible partitioning member for dividing said first sub-chamber into two parts of a first sub-chamber and a first sub-fluid room,
   (c) a second flexible partitioning member for dividing said second sub-chamber into two parts of a second sub-chamber and a second sub-fluid room, and
   (d) a pump for connecting between said first and second sub-fluid rooms, and wherein
   said first sub-chamber is connected to a chamber divided from said first fluid room by said first flexible partitioning member, and
   said second sub-chamber is connected to another chamber divided from said second fluid room by said second flexible partitioning member.

2. A reciprocation apparatus with sealing mechanism in accordance with claim 1, wherein
   said first partitioning member and said second partitioning member are diaphragms or bellows.

3. A reciprocation apparatus with sealing mechanism in accordance with claim 2, wherein:
   said bellows are multiple bellows comprising inside bellows and outside bellows, wherein one end of said inside bellows is connected to said reciprocation member.

4. A reciprocating apparatus with sealing mechanism in accordance with claim 1 further comprising:
   a sensor for measuring quantity of fluid enclosed in said first or second fluid room or said sub-fluid room of said first or second sub-chamber, and
   control means for controlling said pump responding to output signal of said sensor.

5. A reciprocation apparatus with sealing mechanism in accordance with claim 1 wherein
   rigidity of said flexible partitioning member in said sub-chambers is lower than that of said first and second partitioning member.

6. A reciprocation apparatus with sealing mechanism in accordance with claim 1 wherein
   fluid resistance of connecting means for connecting said sub fluid room in said sub-chamber and said fluid room is selected as a value such that fluid move between said sub fluid room in said sub-chamber and said first or second fluid room receive a predetermined resistivity.

7. A reciprocation apparatus with sealing mechanism in accordance with claim 4, wherein:

each freely movable end of said multiple bellows is connected to a lubricative plate having a through-hole through which said reciprocation member movable.

8. A reciprocation apparatus with sealing mechanism comprising:
   a chamber having a side wall supporting a sealing member,
   at least one reciprocation member movably provided in said chamber,
   a sealing member for slidably contacting with said reciprocation member,
   a first flexible partitioning member for contacting with said side wall at peripheral part and with said reciprocation member at inside part,
   a second flexible partitioning member disposed at a position opposing to said first flexible partitioning member with centering said sealing member for contacting with said side wall at peripheral part and with said reciprocation member at inside part,
   a first liquid room enclosed by said first flexible partitioning member, said side wall and said reciprocation member,
   a second liquid room enclosed by said second flexible partitioning member, said side wall and said reciprocation member,
   a pump for connecting said first liquid room and said second liquid room,
   two sub-cavities respectively disposed between said pump and said first liquid room or said second liquid room,
   two flexible partitioning members for parting said two sub-cavities respectively in two parts of a sub-liquid room connected to said first liquid room or said second liquid room and a subfluid chamber connected to a fluid chamber parted from said first liquid room or said second liquid room by said flexible partitioning members.

9. A Stirling engine with sealing mechanism comprising:
   (1) a chamber,
   (2) at least one reciprocation member movable provided in said chamber,
   (3) a sealing member disposed between said reciprocation member and inside wall of said motion chamber in which said reciprocation member moves,
   (4) a first fluid room and a second fluid room defined by both sides of said sealing member, said inside wall of said motion chamber and said reciprocation member,
   (5) a first flexible partitioning member and a second flexible partitioning member respectively partitioning said first fluid room and said second fluid room, respectively, and
   (6) a fluid carrying means for carrying fluid between said first fluid room and said second fluid room and including:
      (a) a first and a second sub-chamber respectively connected to said first an second fluid rooms,
      (b) a first flexible partitioning member for dividing said first sub-chamber into two parts of a first sub-chamber and a first sub-fluid room,
      (c) a second flexible partitioning member for dividing said second sub-chamber into two parts of a second sub-chamber and a second sub-fluid room, and
      (d) a pump for connecting between said first and second sub-fluid rooms, and wherein
         said first sub-chamber is connected to a chamber divided from said first fluid room by said first flexible partitioning member, and
         said second sub-chamber is connected to another chamber divided from said second fluid room by said second flexible partitioning member.

10. A pump with sealing mechanism comprising:
   (1) a chamber,
   (2) at least one reciprocation member movably provided in said chamber,
   (3) a sealing member disposed between said reciprocation member and insidewall of said motion chamber in which said reciprocation member moves,
   (4) a first fluid room and a second fluid room defined by both sides of said sealing member, said inside wall of said motion chamber and said reciprocation member,
   (5) a first flexible partitioning member and a second flexible partitioning member respectively partitioning said first fluid room and said second fluid room, respectively, and
   (6) a fluid carrying means for carrying fluid between said first fluid room and said second fluid room and including:
      (a) a first and a second sub-chambers respectively connected to said first and second fluid rooms,
      (b) a first flexible partitioning member for dividing said first sub-chamber into two parts of a first sub-chamber and a first sub-fluid room,
      (c) a second flexible partitioning member for dividing said second sub-chamber into two parts of a second sub-chamber and a second sub-fluid room, and
      (d) a sub-pump for connecting between said first and second sub-fluid rooms, and wherein
         said first sub-chamber is connected to a chamber divided from said first fluid room by said first flexible partitioning member, and
         said second sub-chamber is connected to another chamber divided from said second fluid room by said second flexible partitioning member.

* * * * *